Figure 1:
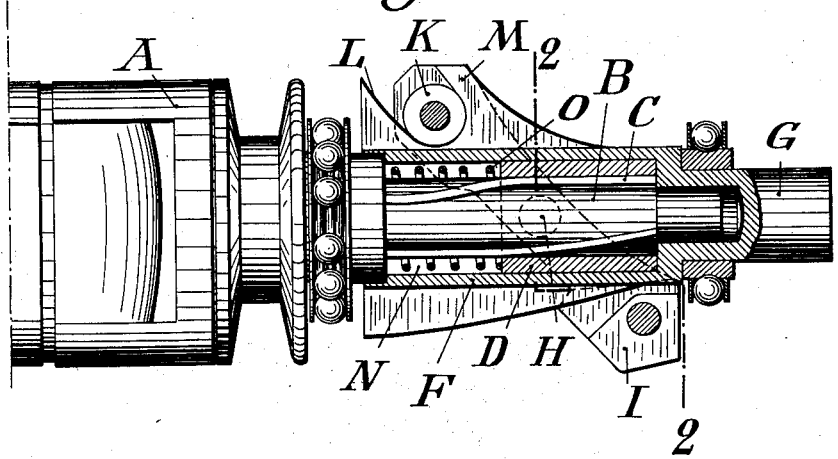

A. DIEMER.
SHAFT COUPLING.
APPLICATION FILED SEPT. 21, 1911.

1,027,644.

Patented May 28, 1912.

WITNESSES

INVENTOR
Anton Diemer

UNITED STATES PATENT OFFICE.

ANTON DIEMER, OF STUTTGART, GERMANY, ASSIGNOR TO THE FIRM OF ROBERT BOSCH, OF STUTTGART, GERMANY.

SHAFT-COUPLING.

1,027,644.      Specification of Letters Patent.      Patented May 28, 1912.

Application filed September 21, 1911. Serial No. 650,643.

*To all whom it may concern:*

Be it known that I, ANTON DIEMER, a subject of the Emperor of Germany, residing at Stuttgart, Germany, have invented certain new and useful Improvements in Shaft-Couplings; and I do hereby declare the following to be a full, clear, and exact description of the invention, such as will enable others skilled in the art to which it appertains to make and use the same.

This invention relates to shaft couplings, and particularly to those adapted to automatically adjust the angular relation of the driving and driven shafts in accordance with the speed of rotation, with especial reference to the application to electric ignition machines driven from internal combustion engines where it is desirable to adjust the ignition period relatively to the stroke of the engine in accordance with the speed of rotation. The attainment of this object has hitherto been sought by using centrifugal masses which rotate with the shaft of the ignition machine, in conjunction with an arrangement by which the armature shaft of the ignition machine has been driven from the motor shaft through a steep pitched screw nut which is axially movable but not rotatable upon one shaft and is adapted to screw on the other shaft. If the weights are so arranged that in response to centrifugal action they adjust the position of the nut against a predetermined resisting force in accordance with the speed of rotation, the relative angular position of the driving and driven shafts may be utilized to adjust the period of ignition relatively to the stroke of the engine. In known devices of this kind, the particular position assumed is generally determined by a simple geometrical rule which includes factors varying with the mode of suspension of the weight, but which is only approximately correct for the particular requirements for automatic adjustment of the period of ignition relatively to the stroke of the engine, because the proper adjustment of the ignition period depends upon a combination of different conditions.
In this invention, the relative angular position of the driving and driven shafts can be adapted to the particular requirements in any application with materially greater accuracy than has been possible heretofore. For driving an electric machine from the engine, the driving shaft and the driven armature shaft of the ignition machine are coupled together in axial alinement with each other by means of an axially movable screw-threaded nut as in previous forms of construction, but the weights are connected to the screw-threaded nut and are positively guided in their movements against the action of a spring by a suitably formed slot or the like, whereby the relative angular adjustment and the ignition period (at different speeds of the engine) depends, aside from the stress of the resisting spring, only upon the form of the guide. The form of the guide may be selected according to any particular requirements and the adjustment of the relative angular positions of the driving and driven shafts may in that way, be accurately determined to give the best results. As a result of this construction, the coupling is simple and compact, while the use of rods and links which are costly and imperfect in working due to lost motion, frictional resistance and wear, is obviated by the employment of the special shaped guide.

Figure 2:
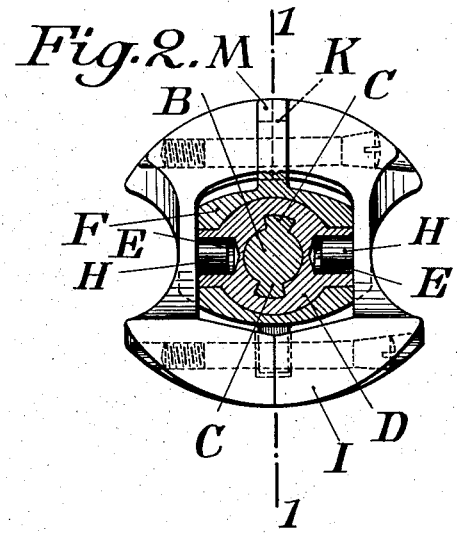

In the accompanying drawings illustrating the preferred form of my invention, Figure 1 is a central longitudinal section on line 1—1 of Fig. 2; and Fig. 2 is a section on line 2—2 of Fig. 1.

The armature A of an electric ignition machine of any suitable type has an extended shaft B which is provided with inclined ribs or screw-threads C of steep pitch. Engaging with the screw-threads C is a screw threaded member or nut D having a pivot bearing E on each side adapted to receive a pivot. The nut D can be shifted axially of the driven shaft B in a sleeve F forming an extension of the driving shaft G which is operatively connected to the crank shaft of the internal combustion engine (not shown) by any suitable gearing having a fixed velocity ratio. The pivots H of the weight I are mounted in the bearings E. In the drawings, the weight I has the form of a heavy extended ring with a roller K at its top supporting the ring I in a slot L in the rim M which is fastened to the shaft G. The spring O resists the inward movement of a nut D in response to increased centrifugal action upon the weight I upon increase of speed of rotation.

In the position of rest, shown in the drawings, the spring O forces the roller K to such a position that the roller is at the bottom of the slot L while the weight I assumes an inclined position. When the driving shaft rotates, the weight I tends toward a position at right angles to the shaft, and thereby axially shifts the nut D to the left and angularly turns the driven shaft B relatively to the driving shaft G in accordance with the speed of rotation. The extent of the shifting movement up to any given speed depends upon the resisting force of spring O, and also upon the shape of the slot L. By suitably shaping the slot, the period of ignition relative to the stroke of the engine can be fixed according to any desired method of variation with the speed of the engine. It is obvious that the weight I, could, if desired, be pivotally mounted in a guide carried by either shaft, while the threads C could also be mounted on either shaft. Furthermore, the spring O could be arranged to act directly on the weight I instead of resisting the nut D.

Various other modifications are obviously within the scope of my invention.

Having thus described my invention, what I claim is:

1. A coupling for driving and driven shafts comprising a shaped guide attached to one of said shafts, a weight supported in said guide and adapted to swing outwardly in response to centrifugal action, a movable member connected to said weight, a spring resisting the outward movement of the weight, and means coöperating with the movable member to adjust the relative angular position of the driving and driven shafts in accordance with the speed of rotation, the stress of the spring and the shape of the guide.

2. A coupling for driving and driven shafts, comprising a shaped guide attached to one of said shafts, a weight supported in said guide and adapted to swing outwardly in response to centrifugal action, a movable threaded member connected to said weight, and a spring resisting the outward movement of the weight, one of said shafts having threads adapted to engage the threads on said member to adjust the relative angular position of the driving and driven shafts in accordance with the speed of rotation, the stress of the spring and the shape of the guide.

3. A coupling for driving and driven shafts in axial alinement with each other comprising a shaped guide attached to the driving shaft, a weight supported in said guide and adapted to swing outwardly in response to centrifugal action, an axially movable threaded nut pivotally connected to the weight, and a spring resisting the movement of the nut upon increase of speed of rotation, the driven shaft having threads adapted to engage the threaded nut to adjust the angular position of the driven shaft relatively to the driving shaft in accordance with the speed of rotation, the stress of the spring and the shape of the guide.

4. A coupling for driving and driven shafts in axial alinement with each other comprising a sleeve attached to one of said shafts and embracing the other of said shafts, a shaped guide attached to said sleeve, a weight supported in said guide and adapted to swing outwardly in response to centrifugal action, an axially movable nut arranged within the sleeve and pivotally connected to the weight, a spring resisting the outward movement of the weight, and means coöperating with the nut to adjust the angular position of one of said shafts relatively to the other of said shafts in accordance with the speed of rotation, the stress of the spring and the shape of the guide.

In testimony whereof I affix my signature, in presence of two witnesses.

ANTON DIEMER.

Witnesses:
REINHOLD ELWERT,
WALTHER STEINCKE.